(12) United States Patent
Charvet et al.

(10) Patent No.: US 10,449,991 B2
(45) Date of Patent: Oct. 22, 2019

(54) DEPTH-ADJUSTABLE STEERING COLUMN MECHANISM WITH A RETRACTABLE STOP

(71) Applicant: Robert Bosch Automotive Steering Vendôme, Vendôme (FR)

(72) Inventors: William Charvet, Chambray-lès-Tours (FR); Jacques Bernier, Montoire-sue-le-Loir (FR); Mickaël Sauquet, Villerable (FR)

(73) Assignee: Robert Bosch Automotive Steering Vendôme, Vendôme (FR)

( * ) Notice: Subject to any disclaimer, the term of this patent is extended or adjusted under 35 U.S.C. 154(b) by 0 days.

(21) Appl. No.: 15/534,860

(22) PCT Filed: Dec. 1, 2015

(86) PCT No.: PCT/EP2015/078121
§ 371 (c)(1),
(2) Date: Jun. 9, 2017

(87) PCT Pub. No.: WO2016/091642
PCT Pub. Date: Jun. 16, 2016

(65) Prior Publication Data
US 2017/0361862 A1 Dec. 21, 2017

(30) Foreign Application Priority Data
Dec. 9, 2014 (FR) ..................... 14 62088

(51) Int. Cl.
*B62D 1/184* (2006.01)
*B62D 1/185* (2006.01)
*B62D 1/19* (2006.01)

(52) U.S. Cl.
CPC ............. *B62D 1/184* (2013.01); *B62D 1/185* (2013.01); *B62D 1/192* (2013.01)

(58) Field of Classification Search
CPC ......... B62D 1/184; B62D 1/185; B62D 1/192
See application file for complete search history.

(56) References Cited

U.S. PATENT DOCUMENTS 8,641,094 B2* 2/2014 Tinnin ................... B62D 1/195
280/775
8,671,795 B2* 3/2014 Ozsoylu ................. B62D 1/184
74/493

(Continued)

FOREIGN PATENT DOCUMENTS

DE  10 2011 056351 A1  6/2013
EP     2 497 696 A1    9/2012

OTHER PUBLICATIONS

International Search Report and Written Opinion issued by the European Patent Office, acting as the ISA, for International Application PCT/EP2015/078121 dated Mar. 9, 2016.

*Primary Examiner* — Nicole T Verley
(74) *Attorney, Agent, or Firm* — McCarter & English, LLP

(57) ABSTRACT

A steering column mechanism (10) comprises a lower body (14), an upper tube (16) that is movable depthwise relative to the lower body (14) along an extension and retraction path, in a direction of retraction and in a direction of extension opposite the direction of retraction, and a locking mechanism (34) for locking the upper tube (16) relative to the lower body (14), movable between a locked position and an unlocked position. A retractable stop (58) is movable relative to the lower body (14) and relative to the locking mechanism (34) between an active position and a retracted position. In the active position, the retractable stop (58) limits the travel of the upper tube (16) in the direction of retraction to an adjustment stop position, whereas in the retracted position, it does not interfere with the upper tube (16). The retractable stop (58) is linked to the locking (Continued)

mechanism via an interlock (65) in such a way as to be in the active position when the locking mechanism (34) is in the unlocked position. The lower body (14) comprises one or more supports (76, 78, 96) for at least partially taking up forces generated by the upper tube (16) on the retractable stop (58) when the locking mechanism (34) is in the unlocked position and the upper tube (16) is in the adjustment stop position in abutment against the retractable stop (58). Preferably, the lower body is provided with guide means (74, 76, 78, 90) for guiding the retractable stop between the retracted position and the active position.

22 Claims, 10 Drawing Sheets

(56) References Cited

U.S. PATENT DOCUMENTS

| | | | | |
|---|---|---|---|---|
| 8,707,818 B2* | 4/2014 | Okada | ............... | B62D 1/184 |
| | | | | 280/775 |
| 8,881,618 B2* | 11/2014 | Buzzard | ............... | B62D 1/184 |
| | | | | 280/775 |
| 8,882,147 B2* | 11/2014 | Schnitzer | ............... | B62D 1/195 |
| | | | | 280/775 |
| 8,888,131 B2* | 11/2014 | Anspaugh | ............... | B62D 1/184 |
| | | | | 280/775 |
| 8,997,600 B2* | 4/2015 | Yamamoto | ............... | B62D 1/16 |
| | | | | 74/492 |
| 9,073,567 B2* | 7/2015 | Yamamoto | ............... | B62D 1/16 |
| 9,132,851 B2* | 9/2015 | Suzuki | ............... | B62D 1/187 |
| 9,162,701 B2* | 10/2015 | Buzzard | ............... | B62D 1/195 |
| 9,415,793 B2* | 8/2016 | Kubota | ............... | B62D 1/184 |
| 9,522,693 B2* | 12/2016 | Tomaru | ............... | B62D 1/184 |
| 10,000,229 B2* | 6/2018 | Matsuno | ............... | B62D 1/189 |
| 2013/0006471 A1* | 1/2013 | Kirmsze | ............... | B62D 1/192 |
| | | | | 701/36 |
| 2014/0137693 A1* | 5/2014 | Buzzard | ............... | B62D 1/184 |
| | | | | 74/493 |
| 2016/0272234 A1* | 9/2016 | Terasawa | ............... | B62D 1/184 |
| 2018/0237054 A1* | 8/2018 | Schnitzer | ............... | B62D 1/187 |
| 2018/0257693 A1* | 9/2018 | Schnitzer | ............... | B62D 1/184 |

\* cited by examiner

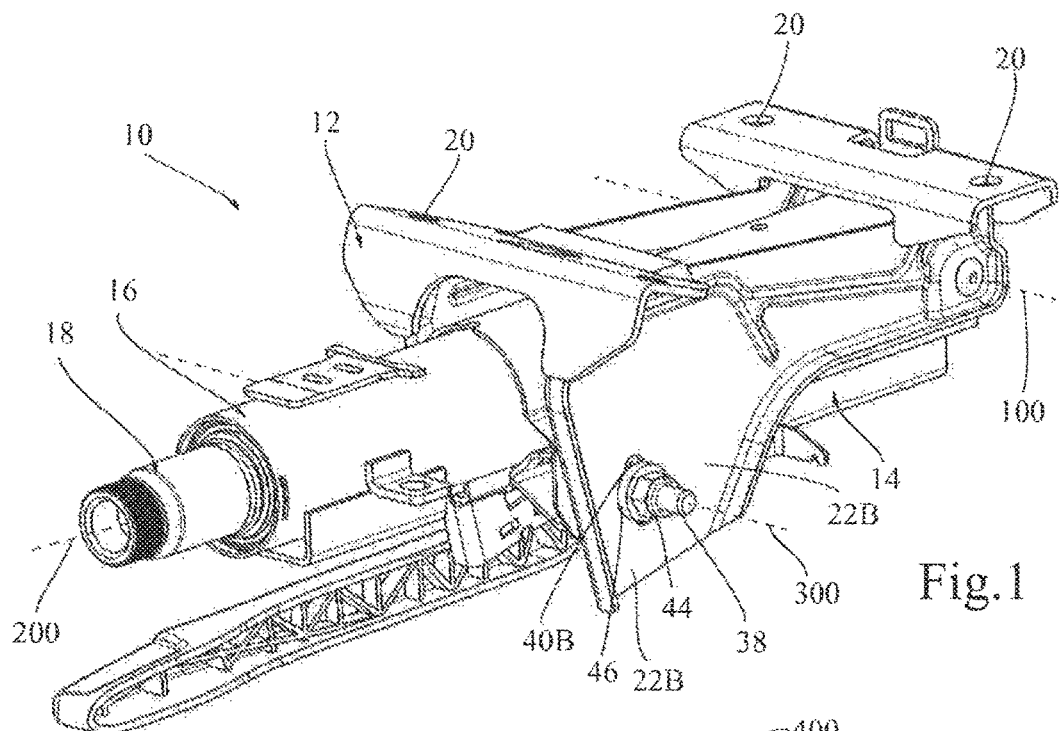
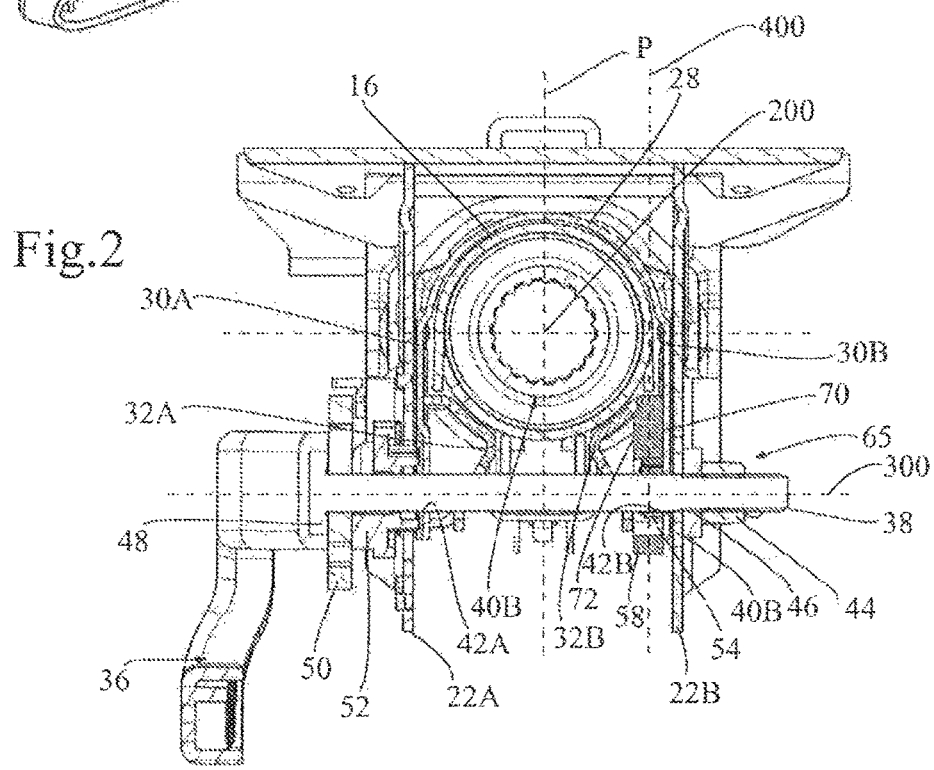

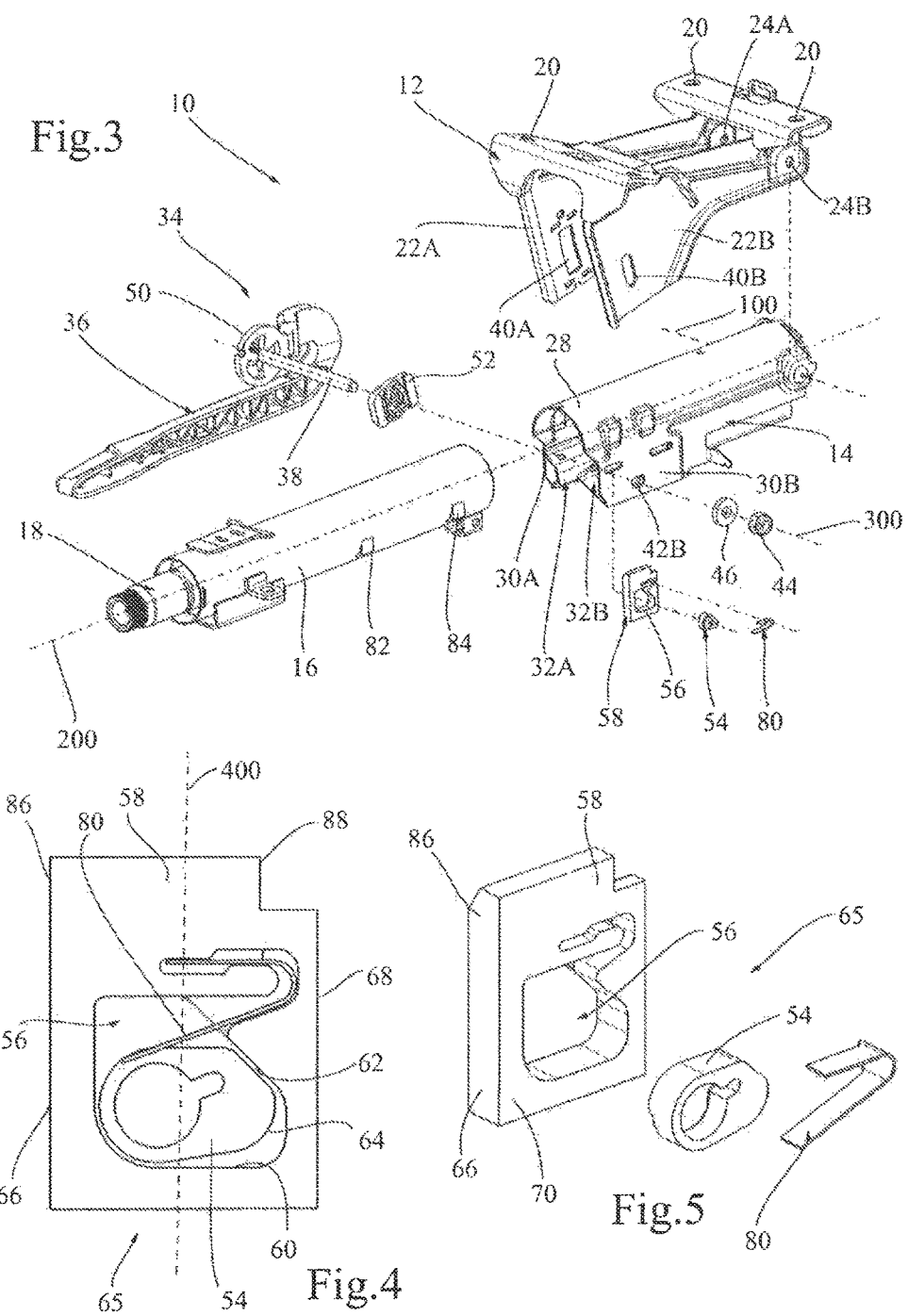

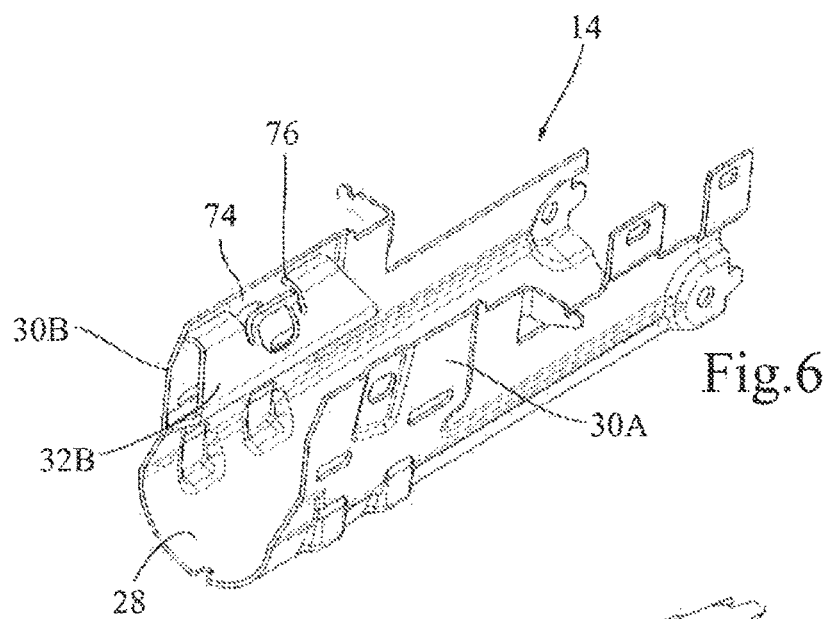
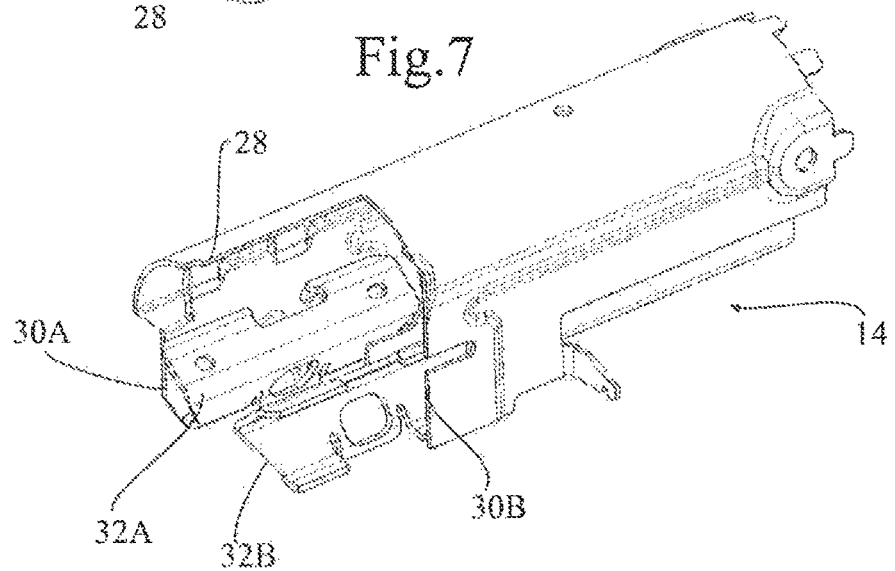
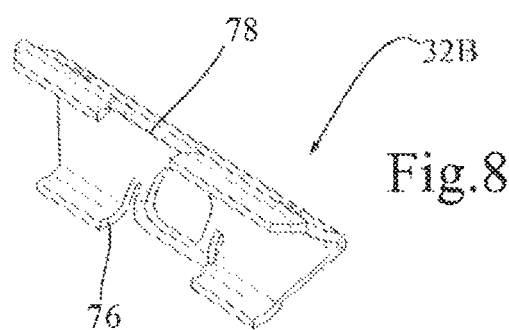

DEPTH-ADJUSTABLE STEERING COLUMN MECHANISM WITH A RETRACTABLE STOP

CROSS-REFERENCE TO RELATED APPLICATIONS

This application is the National Stage entry under 35 U.S.C. § 371 of International Application Number PCT/EP2015/078121 filed on Dec. 1, 2015, published on Jun. 16, 2016 under publication number WO 2016/091642 A1, which claims the benefit of priority under 35 U.S.C. § 119 of French patent application number 1462088 filed Dec. 9, 2014.

TECHNICAL FIELD OF THE INVENTION

The invention relates to a steering column that is adjustable in depth and if appropriate, in height.

PRIOR ART

A vehicle steering column mechanism usually comprises a mobile subassembly comprising a lower body and an upper tube that is movable depthwise relative to the lower body along an extension and retraction path, wherein the upper tube has a stroke limited in the direction of retraction by a retraction stroke end stop defining a retraction stroke end position of the upper tube relative to the lower body and limited in a direction of extension by an extension stroke end stop defining an extension stroke end position relative to the lower body. A locking mechanism, movable between a locked position and an unlocked position locks the upper tube relative to the lower body. An intermediate stop limits the stroke of the upper tube in the direction of retraction to an intermediate adjustment stroke end position between the retraction stroke end position and the extension stroke end position. The driver can thus adjust the position of the upper tube bearing the steering wheel, between the extension stroke end position and the adjustment stroke end position. The distance between the adjustment stroke end position and the retraction stroke end position is only covered in the event that during a collision of the vehicle, the driver's body generates a severing force exceeding a predetermined threshold on the steering wheel and via the latter, on the upper tube, which is transmitted to the intermediate stop and severs the intermediate stop, allowing continuation of the retraction movement of the upper tube. Dimensioning of the intermediate stop is difficult, since the predetermined severing force threshold must necessarily be greater than the forces expected of a driver adjusting the steering wheel position under normal conditions of use, while being as low as possible in order to avoid a force peak prior to severing of the stop in case of a collision. These contradictory constraints may result either in an excessively low threshold value, resulting in unwanted severing during somewhat abrupt adjustment of the steering wheel position, or in an excessively high threshold value, increasing the risk of driver injury in case of a collision.

In order to solve this problem, it was proposed in document DE102011056351 to replace the fixed intermediate stop according to the state of the art with a retractable intermediate stop, driven in rotation by a locking rod of the locking mechanism and movable between an active position, corresponding to the unlocked position of the locking mechanism and a retracted position corresponding to the unlocked position of the locking mechanism, wherein the retractable stop in the active position limits the stroke of the upper tube in the direction of retraction to the intermediate adjustment stroke end position between the retraction stroke end and the extension stroke end position, wherein the retractable stop in the retracted position does not interfere with the upper tube. Hence, it is ensured that in case of collision of the vehicle, the intermediate stop is retracted and the upper tube is free to retract, without any intermediate force peak. It is also possible to dimension the intermediate stop with a high degree of freedom in order to withstand high forces in adjusting the steering wheel position.

The retractable stop preferably has a limited degree of rotation in relation to the locking rod around the latter's rotation axis and is biased towards the active position by a spring. This therefore ensures correct sequencing of locking and retraction of the stop: retraction of the stop is only initiated after adequate rotation of the locking rod that ensures locking of the upper tube by the locking mechanism.

However, the chosen kinematics, with rotation of the stop around the axis of the rod and preferably dead stroke of the rod before driving of the stop, limits the range of movement of the latter and requires positioning the retractable stop in an area of the steering column mechanism in which the locking rod is close to the path of the upper tube. Such an area does not always exist, or may be occupied by other components of the column.

Furthermore, the retractable stop transmits entirely the forces applied to it to the locking rod when the locking mechanism is unlocked and the driver applies a high adjustment force in the direction of retraction, which may damage the clamping mechanism.

SUMMARY OF THE INVENTION

The invention aims to overcome at least partially the disadvantages of the state of the art identified above. In order to achieve this, the invention relates to a steering column mechanism, comprising a lower body and an upper tube that is movable depthwise relative to the lower body along an extension and retraction path, in a direction of retraction and in a direction of extension opposite to the direction of retraction. A locking mechanism, movable between a locked position and an unlocked position, locks the upper tube relative to the lower body. A retractable stop that is movable relative to the lower body and relative to the locking mechanism between an active position and a retracted position, limits in the active position the stroke of the upper tube in the direction of retraction to an adjustment stroke end position, wherein the retractable stop in the retracted position does not interfere with the upper tube. The retractable stop is linked to the locking mechanism via an interlock in such a way as to be in the active position when the locking mechanism is in the unlocked position.

According to a first aspect of the invention, the lower body comprises one or more supports for at least partially taking up the forces generated by the upper tube on the retractable stop when the locking mechanism is in the unlocked position and the upper tube is in the adjustment stroke end position in abutment against the retractable stop. These supports may be either bearing points, ridges or bearing surfaces integral with the lower body and against which the retractable stop can come to rest.

The support or supports preferably includes or include at least one support perpendicular to the path of the upper tube at the level of the retractable stop in the active position. Furthermore, the support or supports preferably includes or include one or several bearing surfaces parallel to the path of the retractable stop between the active position and the retracted position. This therefore limits transmission to the interlock and to the locking mechanism of forces exerted by the driver on the upper tube and on the retractable stop.

According to a second aspect of the invention, the lower body is equipped with guiding means for guiding the retractable stop between the retracted position and the active position. These guiding means allow remote transmission of the movement of the locking mechanism, such that greater freedom in positioning the retractable stop is available.

This second aspect of the invention may be advantageously combined with the first aspect of the invention. In this case, it may in particular be envisaged that the support or supports forms or form part of the guiding means, constituting guiding point, ridges or surfaces.

In practice, the guiding means may advantageously be sliding surfaces directly in contact with matching surfaces on the retractable stop. One may however contemplate providing intermediate elements, for example rolling bodies interposed between sliding surfaces provided on the lower body and on the retractable stop.

According to a preferred embodiment, the retractable stop has a translational movement parallel to a translation axis that is fixed relative to the lower body. The guiding means are in this case preferentially formed of one or several guiding surfaces, flat and parallel to the translation axis, wherein these surfaces may, if necessary, be reduced to ridges or be virtually points.

Alternatively, the retractable stop may execute a rotational movement around an axis that is fixed relative to the lower body and be guided by a cylindrical guiding surface forming a journal bearing between the lower body and the retractable stop.

The adjustment stroke end position is preferably intermediate between an extension stroke end position and a retraction stroke end position of the upper tube relative to the lower body. Preferably, the extension and retraction path is a translation parallel to an axis that is fixed relative to the lower body, which may advantageously be an axis of rotation of an endpiece of a steering shaft guided in rotation inside the upper tube. The invention can also be applied however if the extension and retraction path is curved.

According to a particularly advantageous embodiment, the interlock comprises a return spring for biasing the retractable stop towards the locking position. This spring serves to take up play in the interlock. Furthermore, in an embodiment in which provision is not made for the retractable stop's being driven to its retracted position by the locking mechanism, it serves to keep the stop in the active position in the locked stage of the locking mechanism, as will be explained below.

According to one embodiment, the lower body is movable relative to a fixed support of the steering column mechanism along a tilting path, which may advantageously be rotation around a pivot axis that is fixed relative to the fixed support, wherein the fixed support is provided with an attachment interface for attachment to a vehicle superstructure, wherein the locking mechanism in the locked position locks the lower body relative to the fixed support and wherein the locking mechanism in the unlocked position releases the lower body.

According to one embodiment, the interlock is such that the retractable stop is in the retracted position when the locking mechanism is in the locked position.

According to an alternative embodiment, the locking mechanism releases the retractable stop when it moves from the unlocked position to the locked position, but does not drive it to the retracted position. Under these circumstances, the retractable stop is advantageously maintained in the active position, for example by means of a spring. The upper tube is provided with a plunger interacting with a receiving face of the retractable stop, serving to drive the retractable stop to the retracted position when the locking mechanism is in the locked position and a force exceeding a predetermined threshold is applied to the upper tube and drives the upper tube along the extension and retraction path in the direction of retraction. In practice, the plunger or the receiving face forms a ramp allowing transmission of the movement of the upper tube to the retractable stop. The advantage of this solution lies in avoiding any movement of the retractable stop during the phases of adjustment of the position of the steering column mechanism, which minimises noises and friction. It is only in the event of a collision that the retractable stop retracts. This solution has however two consequences that need to be taken into account when dimensioning the steering column mechanism. Firstly, the interaction between the plunger and the retractable stop causes, when the locking mechanism is unlocked, transmission to the interlock and the locking mechanism of at least a portion of the adjustment forces that the driver may apply to the steering wheel to attempt to retract the column beyond the adjustment stroke end position defined by the retractable stop. Secondly, in case of a collision, the upper tube needs to displace the retractable stop, which results in a momentary increase in the resistance to retraction of the column. Account must therefore be taken of this constraint when dimensioning the plunger and the receiving face.

According to a preferred embodiment, the locking mechanism comprises a locking rod driven in rotation around a locking axis that is preferably fixed relative to the lower body. Preferably, the locking rod is translationally fixed relative to the lower body parallel to the locking axis. The locking rod can be driven in rotation by a drive lever equipped with a gripping handle, wherein the lever may either be integral with the locking rod or be linked to the latter by a transmission device. The locking rod may also be driven in rotation by an electric motor. The lower body comprises at least one guide bearing for rotational guiding of the locking rod and preferably two bearings spaced apart along the locking axis, preferably laterally on either side of a median plane of the lower body, perpendicular to the locking axis. The bearings may if appropriate be simple bores in the flanges of the lower body.

Preferably, the locking rod extends between two lateral flanges of the fixed support, located laterally on either side of the movable subassembly and preferably passes through the lateral flanges, which feature oblong openings for this purpose.

Preferably, the interlock comprises a drive element rotationally integral with the locking rod and interacting with a receiving element integral with the retractable stop. According to one embodiment, the drive element comprises a cam integral with the locking rod and the receiving element comprises a receiving surface, preferably formed on the retractable stop. According to another embodiment, the drive element comprises a toothed sector or a sprocket, wherein the receiving element comprises a rack integral with the retractable stop.

Preferentially, the retractable stop is translationally guided perpendicularly to the locking axis.

According to one embodiment, the drive element comprises a helical thread, wherein the receiving element comprises a nut.

For this embodiment, but also for the embodiments using a cam or a rack, provision may be made for the retractable stop's being translationally guided parallel to the locking axis.

According to another embodiment, the drive element comprises an angular drive gear, wherein the receiving element comprises an angular receiving gear. Under these circumstances, the retractable stop is rotationally guided perpendicularly to the locking axis. Rotational guiding of the retractable stop perpendicularly to the locking axis can also be contemplated in the embodiment using a cam.

BRIEF DESCRIPTION OF THE FIGURES

Further characteristics and advantages of the invention will be clear from reading the following description, made in reference to the appended figures, which show:

in FIG. 1, an isometric view of a steering column mechanism according to a first embodiment of the invention;

in FIG. 2, a cross-sectional view of the steering column mechanism in FIG. 1, in a plane perpendicular to the axis of the steering mechanism and passing through an axis of rotation of a clamping screw of a locking mechanism of the steering column;

in FIG. 3, an exploded view of the steering column mechanism in FIG. 1;

in FIG. 4, a side view of a cam and of a retractable stop of the steering column mechanism in FIG. 1;

in FIG. 5, an isometric view of a lower body of the steering column mechanism in FIG. 1, allowing visualisation of the guiding surfaces of the retractable stop in FIG. 4;

in FIG. 6, an isometric view of the lower body in FIG. 5 according to another angle of view and partially cut away in order to visualise the guiding surfaces of the retractable stop in FIG. 4;

in FIG. 7, an isometric view of a component of the lower body delimiting the guiding surfaces illustrated in FIGS. 5 and 6;

in FIG. 8, an exploded view of the cam and of the retractable stop of the steering column mechanism in FIG. 1;

Figure 9:
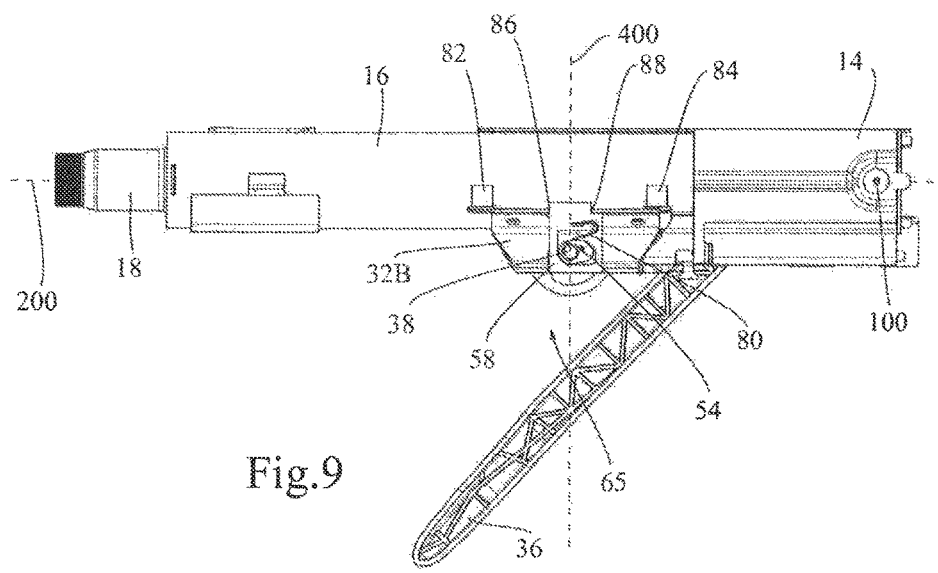
in FIG. 9, a side view of the steering column mechanism in FIG. 1, in an unlocked state, in a nominal position, intermediate between an extension stroke end position and an adjustment stroke end position.

For greater clarity, identical or similar features are identified by identical reference signs in all the figures.

DETAILED DESCRIPTION OF EMBODIMENTS

FIGS. 1 to 3 illustrate a steering column 10 for a motor vehicle, including a fixed support 12 and a movable subassembly, comprising a lower body 14 pivoting relative to the fixed support 12 around a pivot axis 100 and an upper tube 16 that serves as a housing and for rotational guiding for an endpiece of a steering shaft 18 rotating around an axis of rotation 200 perpendicular to the pivot axis 100 and preferably intersecting the latter. In a manner known per se, the upper tube 16 slides in the lower body 14 along a straight path parallel to a geometrical adjustment axis that is fixed relative to the lower body 14, which is in line with the axis of rotation 200 of the endpiece of the steering shaft 18. It is furthermore possible to define a longitudinal median plane P containing the axis of rotation and adjustment 200 perpendicular to the pivot axis 100.

The fixed support 12, preferably made in one piece or by machine-welded assembly, comprises two attachment plates for fixing to a vehicle superstructure with attachment holes 20 and lateral flanges 22A, 22B between which the lower body 14 of the movable subassembly is positioned. The lateral flanges 22A, 22B are equipped with bearings 24A, 24B to guide in rotation the lower body 14 of the movable subassembly around the pivot axis 100.

The lower body 14 essentially consists of a main sheet 26 shaped so as to form a curved bottom 28 extended by two substantially parallel lateral flanges 30A, 30B and two V-shaped clamping flange members 32A, 32B in abutment against the inner faces of the two flanges 30A, 30B and designed to be positioned opposite corresponding surfaces of the upper tube 16.

A locking mechanism 34 ensures simultaneous attachment of the upper tube 16 and the lower body 14 relative to the fixed support 12. This locking mechanism 34 comprises in a manner known per se a locking lever 36 forming a handle for the driver, wherein this lever drives, directly or indirectly, a locking rod 38 around a locking axis 300 perpendicular to the adjustment axis 200 and parallel to the pivot axis 100. The locking rod 38 passes through two curved or straight slides 40A, 40B, created in the lateral flanges 22A, 22B of the fixed support and two aligned holes 42A, 42B created in the lateral flanges 30A, 30B of the lower body. A nut 44 is screwed on to a threaded end of the locking rod 38, opposite the locking lever 36. A thrust washer 46 is interposed between the nut 44 and the lateral flange 22B of the fixed support. The locking rod 38 furthermore comprises a head 48 located on an opposite end to the threaded end. A movable locking cam 50, rotationally integral with the locking rod 38 is interposed between the head 48 of the locking rod and a connector 52 sliding in the slide 40A, wherein this connector 52 forms both a fixed cam rotating relative to the locking rod 38 and a journal bearing for the locking rod 38.

The locking rod 38 is furthermore equipped with an interlock cam 54 arranged laterally on one side of the median longitudinal plane P opposite the locking lever 36, in the volume delimited by the flanges 30A, 30B of the lower body 14. Attachment of the interlock cam 54 to the locking rod 38 can be achieved by any appropriate means, for example by keyway connection, by form fitting with a relief provided on the locking rod 38 or by adhesive bonding or welding. The interlock cam 54 is housed inside a cavity 56 formed in a retractable stop 58 illustrated in detail in FIGS. 4 and 5. The cavity 56 defines flat or concave surfaces 60, 62 which corresponding flat or convex surfaces 64 of the interlock cam 54 can rest against during rotation of the locking rod 38. The interlock cam 54 and the cavity 56 jointly form an interlock 65 between the locking mechanism 34 and the retractable stop 58.

The retractable stop 58 features an outer profile with four flat lateral faces parallel in pairs 66, 68, 70, 72, which enable translational guiding of the retractable stop 58 by sliding along guiding facets and/or ridges provided for this purpose in the lower body and on the clamping flange member 32B. These facets and ridges are visible in FIGS. 6 to 8 and comprise an inner flat face 74 of the flange 30B of the lower body 14 and edges 76, 78 of cutouts provided on the V-shaped flange member 32B. The retractable stop 58 is therefore able to slide translationally relative to the lower body 14, parallel to an axis 400 perpendicular to the axis of rotation of the locking rod, between a retracted position, illustrated in FIGS. 2, 12 and 13 and an active position illustrated in FIGS. 9, 10 and 11. The interlock 65 moreover includes a spring blade 80 installed in the cavity 56 between the interlock cam 54 and the retractable stop 58, in order to bias the retractable stop 58 towards the active position.

The upper tube 16 is equipped with an adjustment stroke end stop 82 and an extension stroke end stop 84, spaced apart from each other along the adjustment axis 200, wherein the adjustment stroke end stop 82 is closer to the endpiece of the steering shaft 18. In the active position, the retractable stop 58 features on the one hand a face 86 oriented towards the adjustment stroke end stop 82, which interferes with the path of the adjustment stroke end stop 82 in the direction of retraction and on the other hand, a face 88 oriented towards the extension stroke end stop 84, which interferes with the extension stroke end stop 84 in the direction of extension.

The steering column mechanism 10 functions in the following manner.

Figure 10:
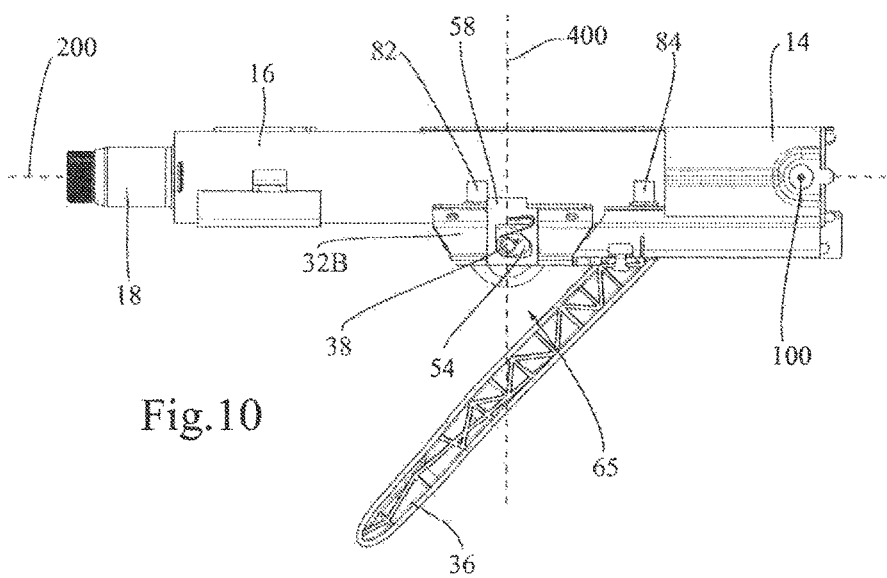
in FIG. 10, a side view of the steering column mechanism in FIG. 1, in the unlocked state, in the extension stroke end position.
Figure 11:
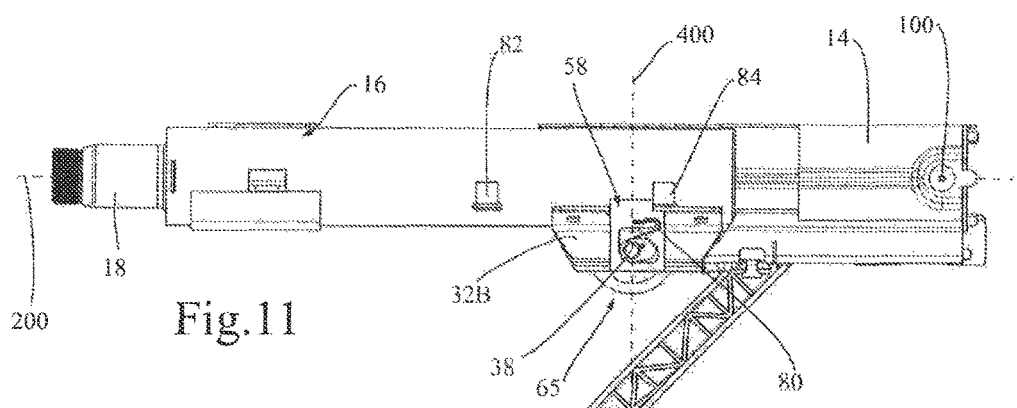
in FIG. 11, a side view of the steering column mechanism in FIG. 1, in the unlocked stage, in the adjustment stroke end position.
Figure 12:
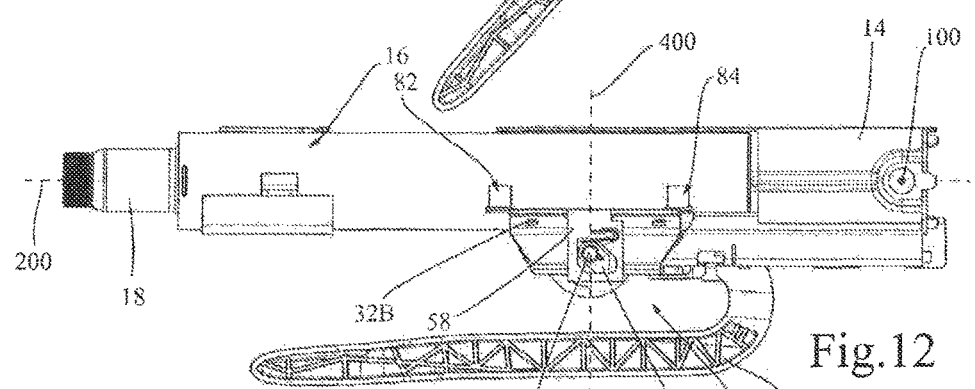
in FIG. 12, a side view of the steering column mechanism in FIG. 1, in an unlocked state, in the nominal position.
Figure 13:
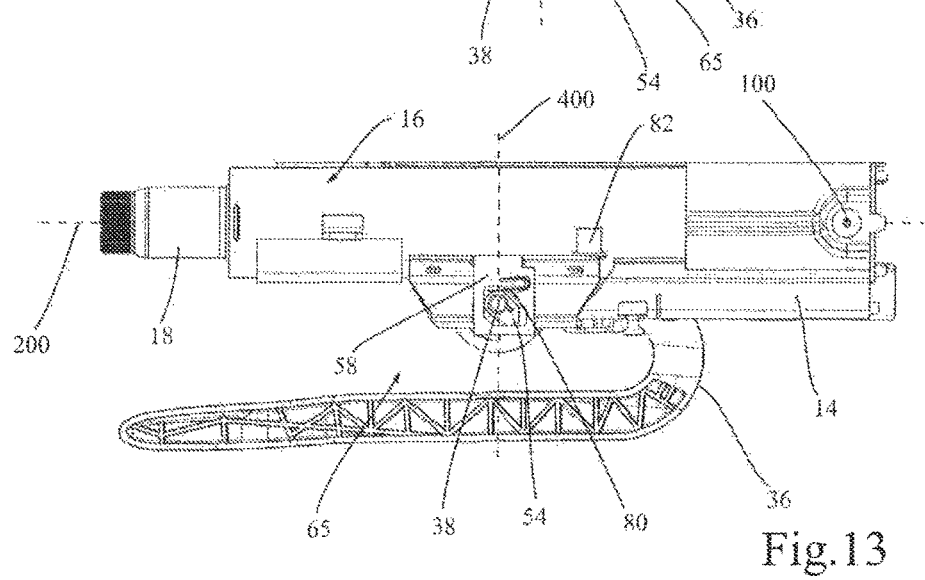
in FIG. 13, a side view of the steering column mechanism in FIG. 1, in a locked state, in a retraction stroke end position.

The locking mechanism 34 is movable between a locked position illustrated in FIGS. 2, 12 and 13 and an unlocked position illustrated in FIGS. 9, 10 and 11.

In the locked position, the locking lever 36 is substantially parallel to the upper tube 16. The angular position of the locking cam 54 is in this case such that the flanges 22A, 22B of the fixed support 2 and the flanges 30A, 30B of the lower body 14 are stressed elastically and flex towards each other and towards the medium longitudinal plane P, driving the flange members 32A, 32B, which move to pinch the upper tube 16 against the rear wall 28 of the lower body 14. The upper tube 16 is locked in position in this case by clamping against the lower body 14, which is itself locked by clamping of the flanges 30A, 30B against the flanges 22A, 22B. The interlock cam 54 is in abutment against the lower flat wall 60 of the cavity 56 of the retractable stop 58 and maintains the retractable stop 58 in the retracted position. In the nominal driving position in FIG. 12, the driver of the vehicle is unable to move the upper tube 16. In the event of a collision, the driver's body, by coming into contact with the steering wheel fixed to the section of steering shaft 18, exerts a force on the upper tube 16 which, as soon as it reaches a threshold determined by the locking mechanism 34 and corresponding to the limit of the axial component of the static resistant forces generated by the flange members 32A, 32B and the rear wall 28 of the lower body 14 on the upper tube 16, causes retraction of the upper tube 16 in the lower body 14, parallel to the adjustment axis 200. This retraction movement of the steering column mechanism 10 is not impeded by the retractable stop 58 in its retracted position and it can be seen in FIG. 13 that the adjustment stroke end stop 82 has been able to move past the position of the retractable stop 58. The retraction stroke of the upper tube is subsequently limited by contact with another element of the steering column mechanism, which defines a retraction stroke end position.

When, starting from the nominal position in FIG. 12 and while the vehicle is stationary, the driver wishes to unlock the column in order to change the position of the steering wheel, s/he moves the locking lever 36 to the position illustrated in FIG. 9. The rotation of the locking lever 36 drives the locking rod 38 in rotation around the latter's axis 300. The locking cam 50 also turns and releases the flanges 32A, 32B, allowing both translational movement of the upper tube 16 in the lower body 14 and a pivoting movement of the lower body 14 in the fixed support 12, limited by the dimensions of the slides 40A, 40B. Rotation of the locking rod 38 also causes rotation of the interlock cam 54, which releases the retractable stop 58. The spring 80 subsequently returns the retractable stop 58 to its active position, as illustrated in FIG. 9. The movement of the upper tube 16 in the lower body 14 is therefore limited in the direction of retraction by the interference between the face 86 of the retractable stop 58 and the adjustment stroke end stop 82, as illustrated in FIG. 10 and in the direction of extension by the interference between the face 88 of the retractable stop 58 and the extension stroke end stop 84, as illustrated in FIG. 11. The driver's efforts to retract the steering wheel and the upper tube 16 beyond the adjustment stroke end position are transmitted by the adjustment stroke end stop 82 to the retractable stop 58 and by the latter to the guiding walls 76, 78.

Once the driver has completed adjustment of the position of the steering wheel and of the upper tube, s/he turns the locking lever 36 again and the steering column mechanism 10 returns to the state illustrated in FIG. 12.

A number of different variations of the interlock 65 are possible. The interlock cam 54 can be shaped such that in the unlocked position, the cam 54 positively abuts on a wall 62 of the cavity 56 in order to confirm positioning of the retractable stop in the active position. It is possible to arrange for the interlock cam 54, in the active position, to be positioned without inducing locking, i.e. such that a force applied to the retractable stop 58 towards the retracted position turns the interlock cam 54 and the locking rod 38. Conversely, provision can be made for irreversibility of transmission, such that in the active position of the locking lever 36, a force applied to the retractable stop 58 towards the retracted position does not allow any rotation of the interlock cam 54.

Provision may also be made for absence of contact between the interlock cam 54 and the retractable stop 58 when the locking lever 38 is in the unlocked position and the retractable stop 58 is in the active position. In this case, it is only the return spring 80 that maintains the retractable stop 58 in position.

The interlock cam 54 can be shaped so as to provide for a desired sequencing between raising the retractable stop 58 to the active position and release of the upper tube 16. Both events can be rendered simultaneous, or conversely provision can be made for completion of one before the other. Provision may be made for example for completing raising of the retractable stop 58 to the active position before fully releasing the upper tube 16, so that the upper tube 16 cannot be moved before the retractable stop 58 is in the active position.

Figure 14:
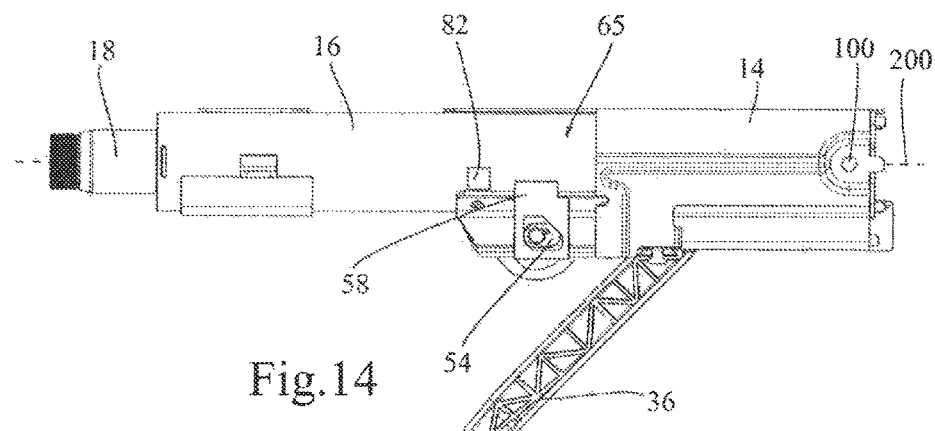
in FIG. 14, a side view of a steering column mechanism according to a second embodiment of the invention, in an unlocked state, in a nominal position, intermediate between an extension stroke end position and an adjustment stroke end position.
Figure 15:
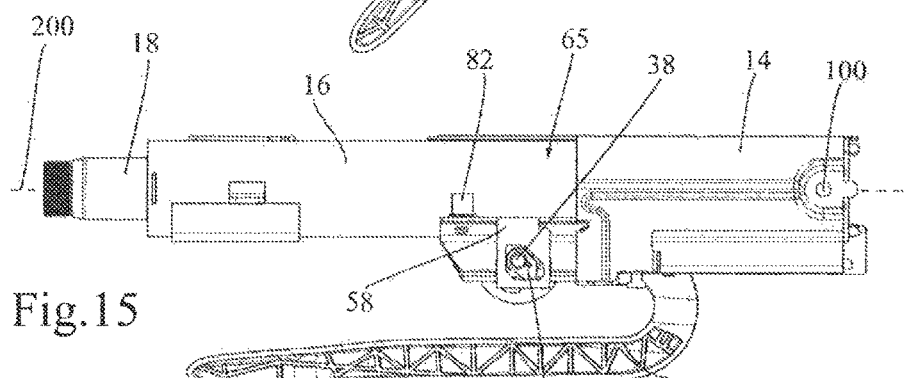
in FIG. 15, a side view of the steering column mechanism in FIG. 14, in a locked state, in the nominal position.
Figure 16:
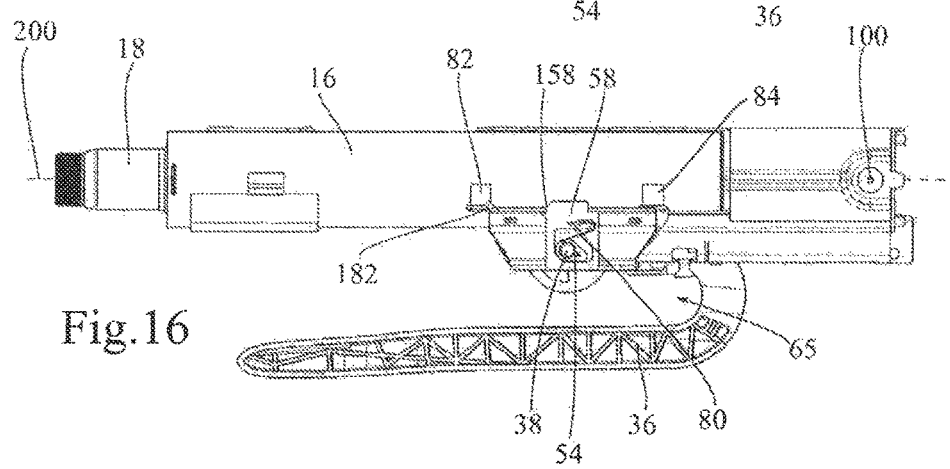
in FIG. 16, a side view of a steering column mechanism according to a third embodiment of the invention, in a locked state, in a nominal position, intermediate between an extension stroke end position and an adjustment stroke end position.

According to a variant illustrated in FIGS. 14 and 15, the return spring 80 can be omitted and the retractable stop 58 can be moved solely by means of the interlock cam 54. Under these circumstances, the interlock cam 54 interacts with a first surface 60 of the cavity 56 to maintain the retractable stop 58 in the retracted position when the locking lever 36 is in the locked position and with a second surface 62 of the cavity 56 to maintain the retractable stop 58 in the active position when the locking lever 36 is in the unlocked position.

Figure 17:
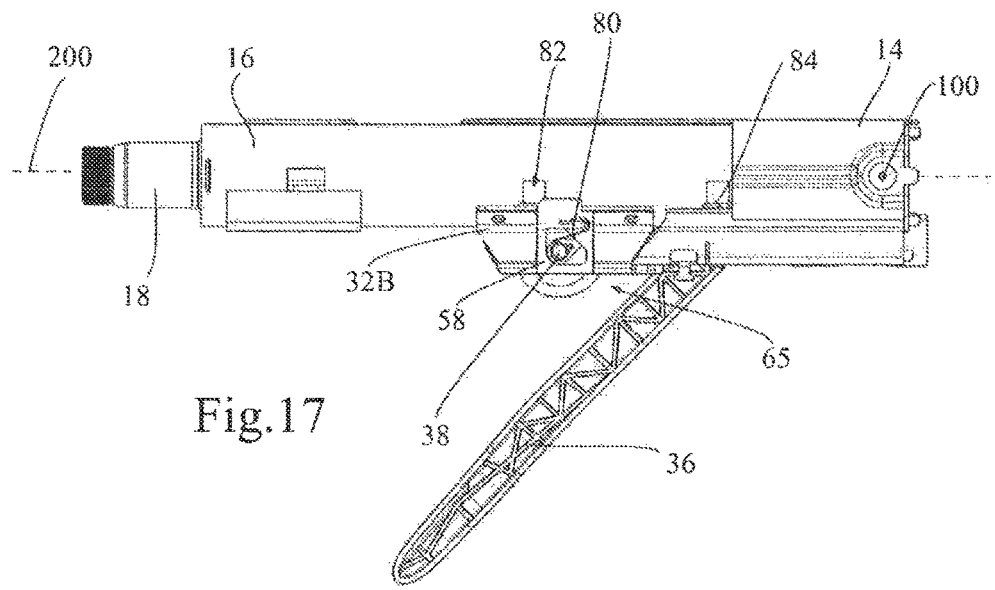
in FIG. 17, a side view of the steering column mechanism in FIG. 16, in the unlocked state, in an extension stroke end position.
Figure 18:
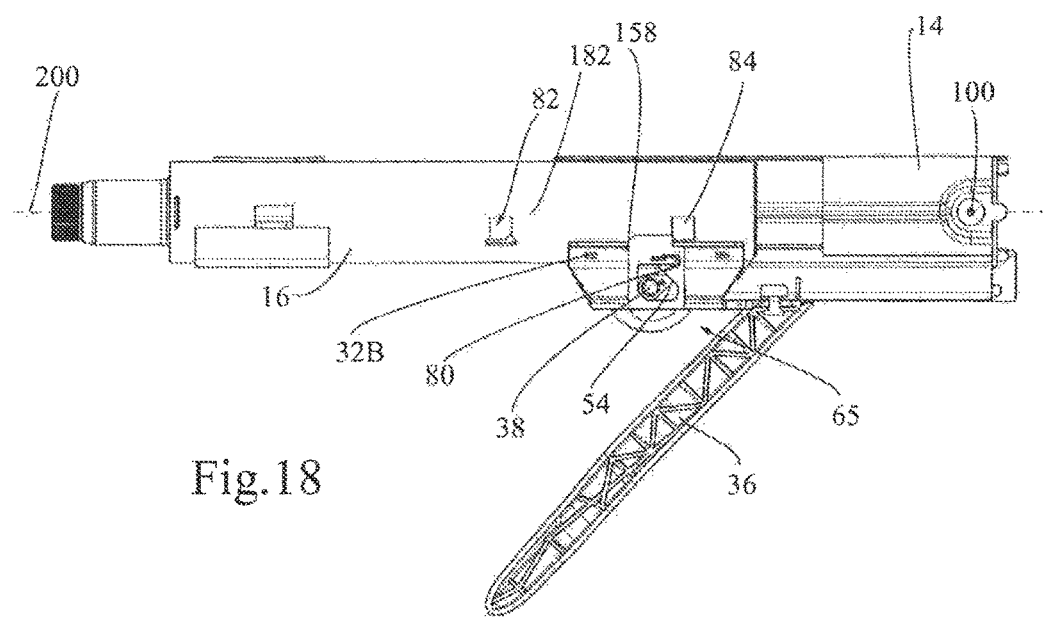
in FIG. 18, a side view of the steering column mechanism in FIG. 16, in the unlocked state, in an adjustment stroke end position.
Figure 19:
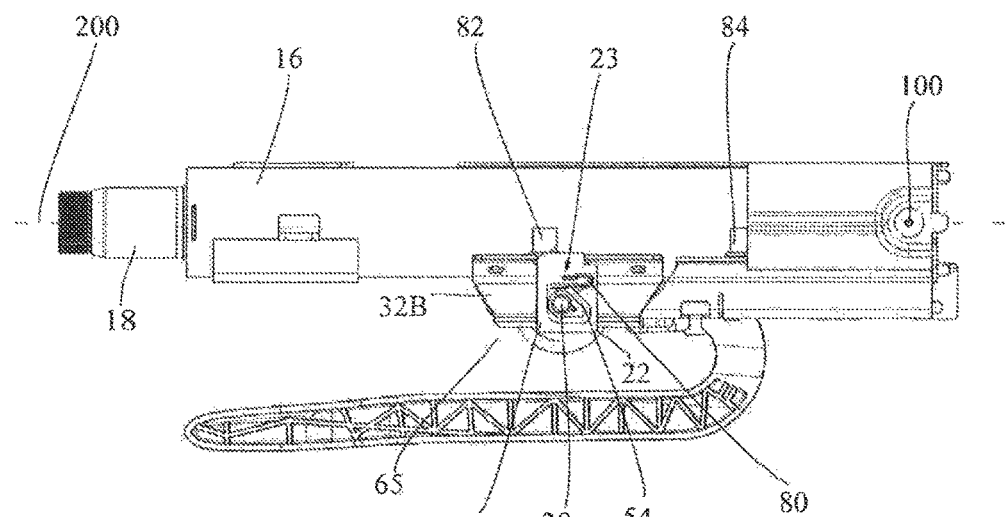
in FIG. 19, a side view of the steering column mechanism in FIG. 16, in a locked state, in a retraction stroke end position.

According to an embodiment illustrated in FIGS. 16 to 19, it is possible to avoid any movement of the retractable stop 58 outside collision situations. The retractable stop 58 has been modified here so as to comprise a chamfer 158 on the side facing the adjustment stroke end stop 82, wherein the latter has a corresponding chamfer 182. In the locked nominal position in FIG. 16 and unlike the previous embodiments, the interlock cam 54 does not interfere with the walls of the cavity 56, so that the retractable stop 58 is maintained in active position under the action of the return spring 80. In the unlocked position, in FIGS. 17 and 18, the cam has turned in the cavity and has come to rest on a face 62 of the cavity in order to resist movement of the retractable stop 58. The positional adjustment movements of the upper tube 16 relative to the lower body 14 are limited, as in the previous embodiments, by the interferences between the retractable stop 58 and the adjustment stroke end stop 82 and extension stroke end stop 84, as illustrated in FIGS. 17 and 18. In the adjustment stroke end position, the chamfer 182 of the adjustment stroke end stop 82 comes to rest against the chamfer 158 of the retractable stop 58, but the interlock cam 54 (assisted if necessary by the return spring 80) prevents the retractable stop 58 from moving to the retracted position. When, starting from the locked position in FIG. 16, a collision brings the driver in contact with the steering wheel, the force exerted on the upper tube 16 drives the steering column mechanism 10 into the retracted position (not illustrated), passing through the intermediate position in FIG. 19. This position illustrates retraction of the retractable stop 58 on passage of the adjustment stroke end stop 82, facilitated by the chamfers 158, 182, which make it possible to overcome the elastic force of the return spring 80, wherein the movement of the retractable stop 58 to the retracted position is no longer prevented by the cam 54.

This embodiment introduces a force peak on passage of the adjustment stroke end position during a collision, but this force is determined by the return spring 80 (which may be relatively weak) and independent of the nominal force that the retractable stop 58 must retain during the positional adjustments of the upper tube 16 (wherein this nominal force is determined by the interlock cam 54). Absence of movement of the retractable stop 58 during locking and unlocking of the locking mechanism avoids risks of noises or wear during the positional adjustments. It also limits the energy to be deployed in transferring from one position to another.

Figure 20:
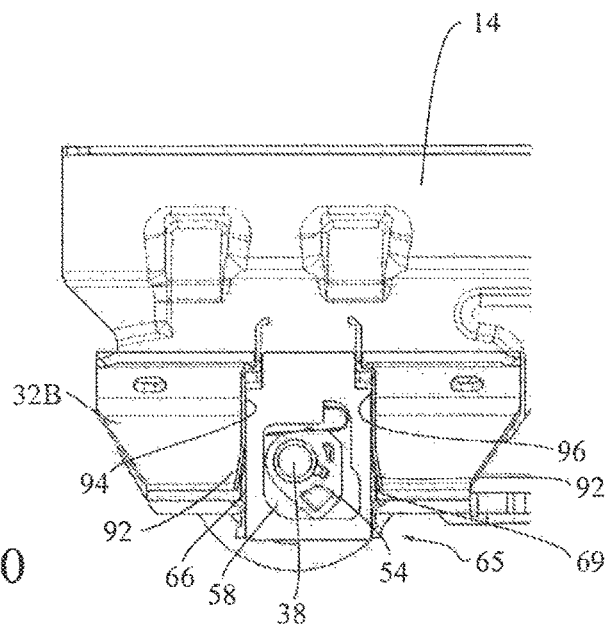
in FIG. 20, a side view of a detail of a steering column mechanism according to a fourth embodiment of the invention, in an unlocked position.
Figure 21:
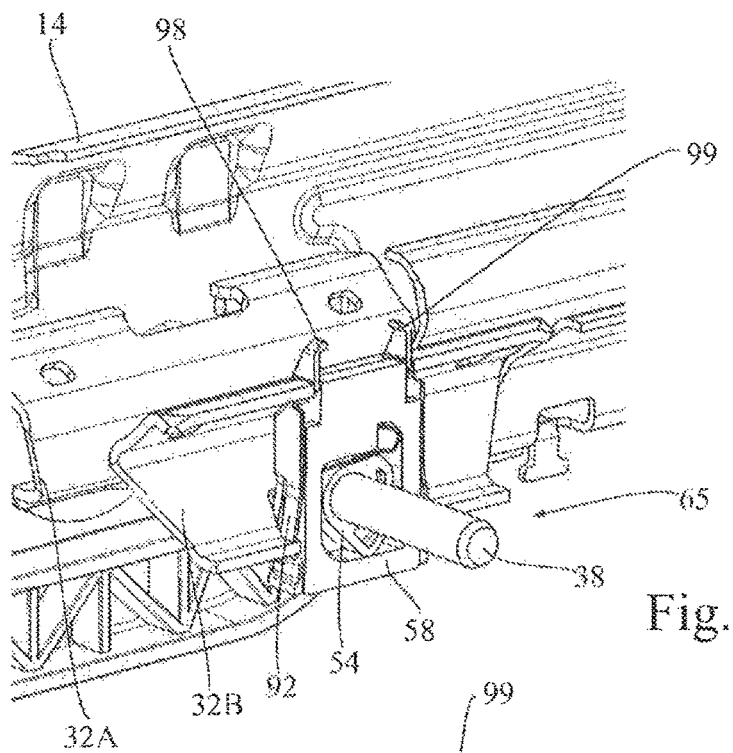
in FIG. 21, an isometric view of a detail of the steering column mechanism in FIG. 20, in the unlocked position.
Figure 22:
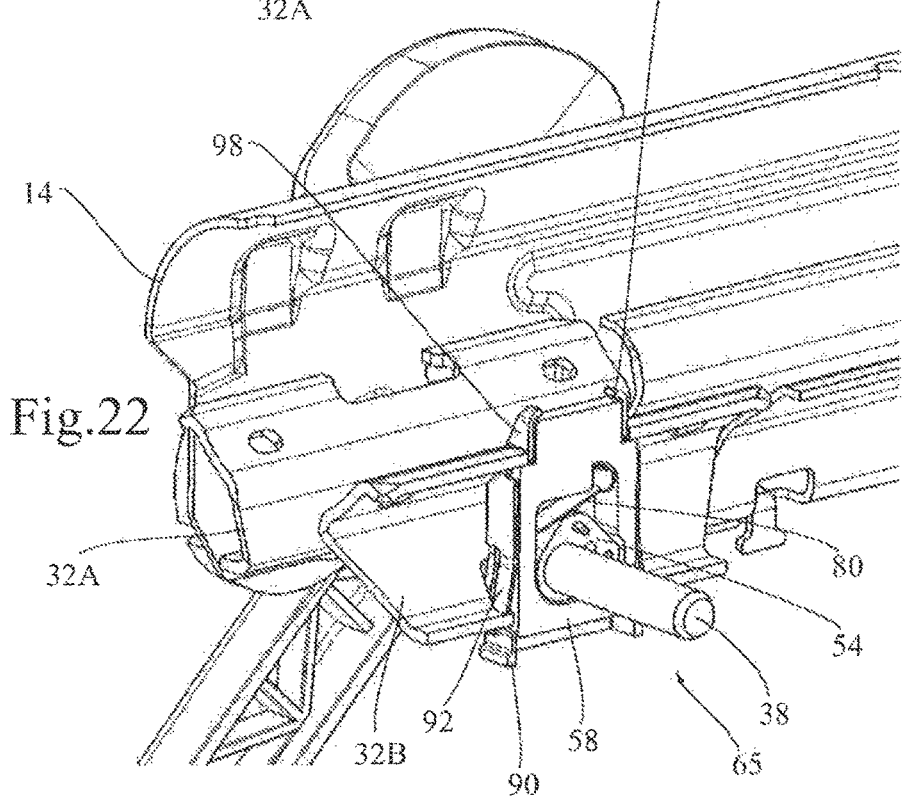
in FIG. 22, an isometric view of a detail of the steering column mechanism in FIG. 20, in the locked position.

Another embodiment of the invention is illustrated in FIGS. 20 to 22, which differs from the embodiment in FIGS. 1 to 13 by addition of a sheath 90 for guiding the retractable stop 58. This sheath 90, made of plastic material, is clipped in place by means of elastic lugs 92 on the walls of the flange member 32B and features two flat guiding walls 94, 96 that come into sliding contact with the walls 66, 68 of the retractable stop. The sheath 90 also has two buffers 98, 99 which, in the unlocked position shown in FIG. 22, are in contact with the retractable stop 58 in the active position, in order to be interposed between the retractable stop 58 and the extension stroke end stop 84 and adjustment stroke end stop 82, in order to absorb the shocks on arrival at the stroke end position during adjustment of the position of the upper tube 16. When the steering column mechanism 10 is in the locked position, the retractable stop 58 is in the retracted position as illustrated in FIGS. 20 and 21 and the buffers 98, 99 protrude on the potential path of the adjustment stroke end stop 82. In case of a collision, the adjustment stroke end stop 82, on arriving at the buffers 98, 99, severs the latter and continues its travel towards the retraction stroke end position. The force required to sever the buffers 98, 99 is very small in comparison to the forces generated on the upper tube at the time of collision. If however it is necessary to minimise the severing force, provision may be made for thinning at the link between the buffers 98, 99 and the remainder of the sheath 90. It is also possible not to provide any buffers 98, 99.

Figure 23:
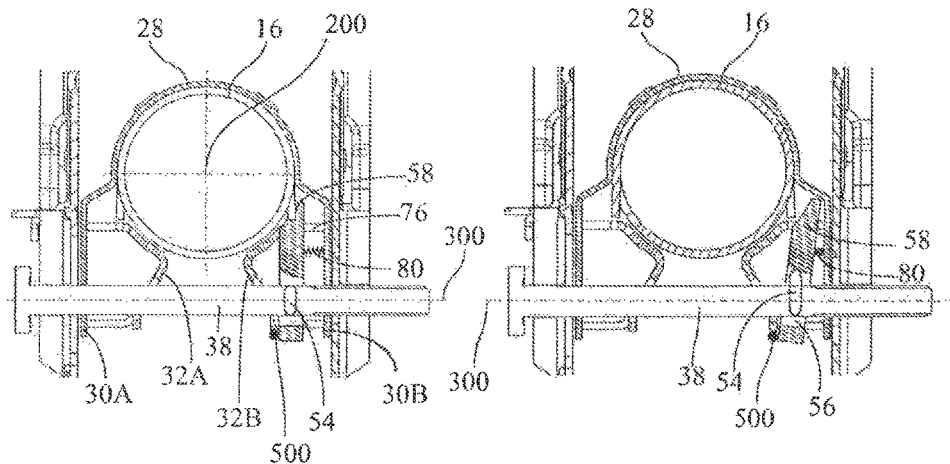
in FIG. 23, a diagrammatic cross-sectional view of a detail of a steering column mechanism according to a fifth embodiment of the invention, in the unlocked position.
Figure 24:
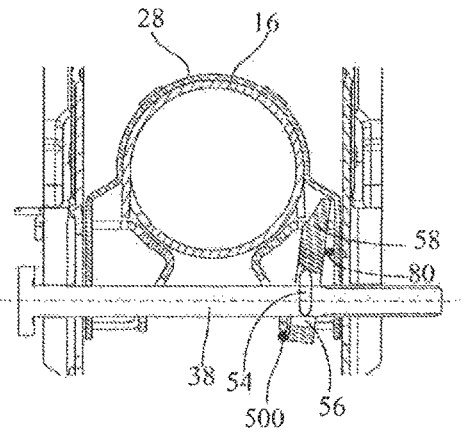
in FIG. 24, a diagrammatic cross-sectional view of a detail of the steering column mechanism in FIG. 23, in the locked position.

According to another embodiment illustrated in FIGS. 23 and 24, it may be envisaged that the retractable stop is no longer translationally guided relative to the lower body as in the previous embodiments, but instead rotationally around a tilting axis materialised by a joint 500 which is fixed relative to an element of the lower body, in this case the flange member 32B. Here, the tilting axis is parallel to the adjustment axis 200, although other orientations are possible. The interlock cam 54, integral with the clamping screw as in the other embodiments, is housed in a cavity 56 of the retractable stop 58 and interacts with curved faces of the cavity 56 in order to drive the retractable stop 58 rotationally around the tilting axis from the active position in FIG. 23 when the screw is in the unlocked position, to the retracted position in FIG. 24 when the screw is in the locked position. A return spring 80 ensures return of the retractable stop 58 to the active position in FIG. 23 when the clamping screw 38 returns to the unlocked position. In this embodiment, as in the previous embodiments, the retractable stop is housed in a cutout of the flange member 32B having edges 76 that form bearing surfaces for the retractable stop 58 in the active position and guiding faces for guiding the retractable stop 58 between the active position and the retracted position.

Figure 25:
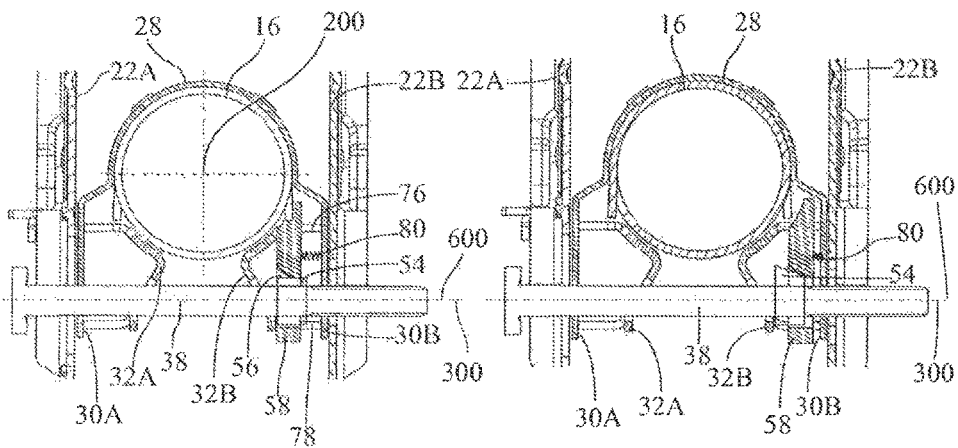
in FIG. 25, a diagrammatic cross-sectional view of a detail of a steering column mechanism according to a sixth embodiment of the invention, in the unlocked position.
Figure 26:
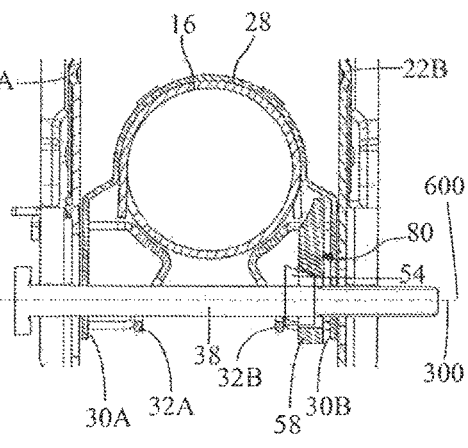
in FIG. 26, a diagrammatic cross-sectional view of a detail of the steering column mechanism in FIG. 25, in the locked position.

According to another embodiment illustrated in FIGS. 25 and 26, it may be envisaged that the retractable stop is no longer translationally guided perpendicularly to the locking axis 300 but instead parallel to the latter. The interlock cam 54, integral with the clamping screw as in the other embodiments, is housed in a cavity 56 of the retractable stop 58 and interacts with curved faces of the cavity 56 in order to drive the retractable stop 58 translationally parallel to a translation axis 600, itself parallel to the locking axis 300, from the active position in FIG. 25 when the screw is in the locked position, to the active position in FIG. 26 when the screw is in the unlocked position. A return spring 80 ensures return of the retractable stop 58 to the active position in FIG. 25 when the clamping screw 38 returns to the unlocked position. In this embodiment, as in the previous embodiments, the retractable stop is housed in a cutout of the flange member 32B having edges 76, 78 that form bearing surfaces for the retractable stop 58 in the active position and guiding faces for guiding the retractable stop 58 between the active position and the retracted position.

According to an alternative embodiment not illustrated, the retractable stop can be guided so as to combine a rotational movement around a tilting axis and a translational movement of this tilting axis parallel to the locking axis 300.

Many other variants are obviously possible.

The lateralised position of the retractable stop 58 relative to the median longitudinal plane P makes it possible to release space near the median longitudinal plane P and the adjustment axis 200 of the steering column mechanism 10, in order to incorporate other functions. It is however possible to place the retractable stop 58 in the median plane P or at any other appropriate position, wherein one of the advantages of the invention is precisely to allow spacing of the retractable stop 58 away from the locking mechanism 34.

Various other modifications may be contemplated:
the extension stroke end stop 84 and adjustment stroke end stop 82 may be executed in the form of separate parts or lugs formed directly on the upper tube 16;
the retractable stop 58 may be equipped with rubber shock absorbing elements to limit noise on contact and shock on contact with the adjustment stroke end stop 82 and extension stroke end stop 84;
the retractable stop 58 may be duplicated on either side of the median longitudinal plane P in order to increase resistance to forces during the positional adjustments of the upper tube 16;
the interlock cam 54 may be directly formed on the locking rod 34; the main sheet of the lower body 3 and the clamping flange members 4 and 5 may be one and the same component;
the return spring 80 may be eliminated in the embodiment in FIGS. 16 to 19, by making provision for trapping by friction between the retractable stop and the flange member;
the retractable stop does not necessarily interact with the extension stroke end stop. Provision can be made on the lower body 14 for a fixed stop, the function of which is to limit extension stroke by interacting with the extension stroke end stop 84. Under these circumstances, this fixed stop must be positioned so as not to interfere with the path of the adjustment stroke end stop 82.

Furthermore, the actual locking mechanism 34 may be of any type, motorised or not. The clamping screw 38 may or may not execute a translational movement parallel to the locking axis 300. The clamping screw 38 may if necessary be situated solely on one side of the median longitudinal plane P. Guidance of the upper tube 16 relative to the lower body 14 may be of any kind. It may define a translational path parallel to a fixed axis 200 relative to the lower body, but not necessarily parallel to the axis of rotation of the endpiece of the shaft 18. It may also involve a rotational path around an axis perpendicular to the axis of rotation of the endpiece of the shaft 18. The invention is also applicable in the absence of movement between the fixed support 12 and the lower body 14, wherein both these components may in this case form a single element if the lower body 14 is provided with an attachment interface for attachment to the vehicle superstructure.

Depending on the type of steering column, provision may advantageously be made for an energy dissipation mechanism that dissipates at least partially the kinetic energy of the driver's body throughout retraction stroke in a controlled and gradual manner, for example by plastic deformation and/or tearing of a component such as a metallic strip. Provision may also be made under certain circumstances, particularly in cases of use of the vehicle without a seatbelt, for a retraction assistance mechanism that induces or accelerates retraction of the steering column mechanism on detection of an impact, for example by a pyrotechnic charge or release of a spring.

The invention claimed is:

1. Steering column mechanism, comprising:
   a lower body;
   an upper tube that is movable depthwise relative to the lower body along an extension and retraction path, in a direction of retraction and in a direction of extension opposite to the direction of retraction;
   a locking mechanism for locking the upper tube relative to the lower body, wherein the locking mechanism is movable between a locked position and an unlocked position, and comprises a locking rod driven in rotation around a locking axis;
   a retractable stop that is movable relative to the lower body and relative to the locking mechanism between an active position and a retracted position, wherein the retractable stop in the active position limits the stroke of the upper tube in the direction of retraction to an adjustment stroke end position, wherein the retractable stop in the retracted position does not interfere with the upper tube, wherein the retractable stop is linked to the locking mechanism via an interlock in such a way as to be in the active position when the locking mechanism is in the unlocked position;
   wherein the lower body comprises one or more supports against which the retractable stop can come to rest for at least partially taking up forces generated by the upper tube on the retractable stop when the locking mechanism is in the unlocked position and the upper tube is in the adjustment stroke end position in abutment against the retractable stop.

2. Steering column mechanism according to claim 1, wherein the one or more supports include at least one support perpendicular to the extension and retraction path of the upper tube at the level of the retractable stop in the active position.

3. Steering column mechanism according to claim 1, wherein the one or more supports include one or several bearing surfaces parallel to a path of the retractable stop between the active position and the retracted position.

4. Steering column mechanism according to claim 1, wherein the lower body is equipped with guiding means for guiding the retractable stop between the retracted position and the active position.

5. Steering column mechanism according to claim 4, wherein the retractable stop is movable in translation between the retracted position and the active position parallel to a translation axis that is fixed relative to the lower body.

6. Steering column mechanism according to claim 4, wherein the retractable stop is rotatable between the retracted position and the active position around a tilting axis that is fixed relative to the lower body.

7. Steering column mechanism according to claim 1, wherein the extension and retraction path is a translation path parallel to an axis that is fixed relative to the lower body.

8. Steering column mechanism according to claim 1, wherein the interlock comprises a spring for biasing the retractable stop towards the active position.

9. Steering column mechanism according to claim 1, wherein the lower body is movable relative to a fixed support of the steering column mechanism, along a tilting path, wherein the fixed support is equipped with an attachment interface for attachment to a vehicle superstructure, wherein the locking mechanism in the locked position locks the lower body relative to the fixed support, wherein the locking mechanism in the unlocked position releases the lower body.

10. Steering column mechanism according to claim 1, wherein the interlock is such that the retractable stop is in the retracted position when the locking mechanism is in the locked position.

11. Steering column mechanism according to claim 1, wherein the locking mechanism releases the retractable stop when it moves from the unlocked position to the locked position, but does not drive the retractable stop to the retracted position.

12. Steering column mechanism according to claim 11, wherein the upper tube is provided with a plunger interacting with a receiving face of the retractable stop, for driving the retractable stop to the retracted position when the locking mechanism is in the locked position and a force exceeding a predetermined threshold is applied to the upper tube and drives the upper tube in the direction of retraction.

13. Steering column mechanism according to claim 1, wherein the interlock comprises a drive element rotationally integral with the locking rod and interacting with a receiving element integral with the retractable stop.

14. Steering column mechanism according to claim 13, wherein the drive element comprises a cam integral with the locking rod and the receiving element comprises a receiving surface.

15. Steering column mechanism according to claim 1, wherein the retractable stop is translationally guided perpendicularly to the locking axis.

16. Steering column mechanism according to claim 1, wherein the retractable stop is translationally guided parallel to the locking axis.

17. Steering column mechanism according to claim 1, wherein the retractable stop is rotationally guided perpendicularly to the locking axis.

18. Steering column mechanism according to claim 2, wherein the lower body is equipped with guiding means for guiding the retractable stop between the retracted position and the active position.

19. Steering column mechanism according to claim 14, wherein the receiving element is formed on the retractable stop.

20. Steering column mechanism according to claim 1, wherein the locking axis is fixed relative to the lower body.

21. Steering column mechanism, comprising:
a lower body;
an upper tube that is movable depthwise relative to the lower body along an extension and retraction path, in a direction of retraction and in a direction of extension opposite to the direction of retraction;
a locking mechanism for locking the upper tube relative to the lower body, wherein the locking mechanism is movable between a locked position and an unlocked position, and comprises a locking rod driven in rotation around a locking axis;
a retractable stop that is movable relative to the lower body and relative to the locking mechanism between an active position and a retracted position, wherein the retractable stop in the active position limits the stroke of the upper tube in the direction of retraction to an adjustment stroke end position, wherein the retractable stop in the retracted position does not interfere with the upper tube, wherein the retractable stop is linked to the locking mechanism via an interlock in such a way as to be in the active position when the locking mechanism is in the unlocked position;
wherein the lower body comprises one or more supports for at least partially taking up forces generated by the upper tube on the retractable stop when the locking mechanism is in the unlocked position and the upper tube is in the adjustment stroke end position in abutment against the retractable stop,
wherein the lower body is equipped with guiding means for guiding the retractable stop between the retracted position and the active position, and
wherein the retractable stop is movable in translation between the retracted position and the active position parallel to a translation axis that is fixed relative to the lower body.

22. Steering column mechanism, comprising:
a lower body;
an upper tube that is movable depthwise relative to the lower body along an extension and retraction path, in a direction of retraction and in a direction of extension opposite to the direction of retraction;
a locking mechanism for locking the upper tube relative to the lower body, wherein the locking mechanism is movable between a locked position and an unlocked position, and comprises a locking rod driven in rotation around a locking axis;
a retractable stop that is movable relative to the lower body and relative to the locking mechanism between an active position and a retracted position, wherein the retractable stop in the active position limits the stroke of the upper tube in the direction of retraction to an adjustment stroke end position, wherein the retractable stop in the retracted position does not interfere with the upper tube, wherein the retractable stop is linked to the locking mechanism via an interlock in such a way as to be in the active position when the locking mechanism is in the unlocked position;
wherein the lower body comprises one or more supports for at least partially taking up forces generated by the upper tube on the retractable stop when the locking mechanism is in the unlocked position and the upper tube is in the adjustment stroke end position in abutment against the retractable stop,
wherein the lower body is equipped with guiding means for guiding the retractable stop between the retracted position and the active position, and
wherein the retractable stop is rotatable between the retracted position and the active position around a tilting axis that is fixed relative to the lower body.

* * * * *